No. 886,628. PATENTED MAY 5, 1908.
M. DA S. NETTO.
SIGHTING TELESCOPE.
APPLICATION FILED JAN. 8, 1907.
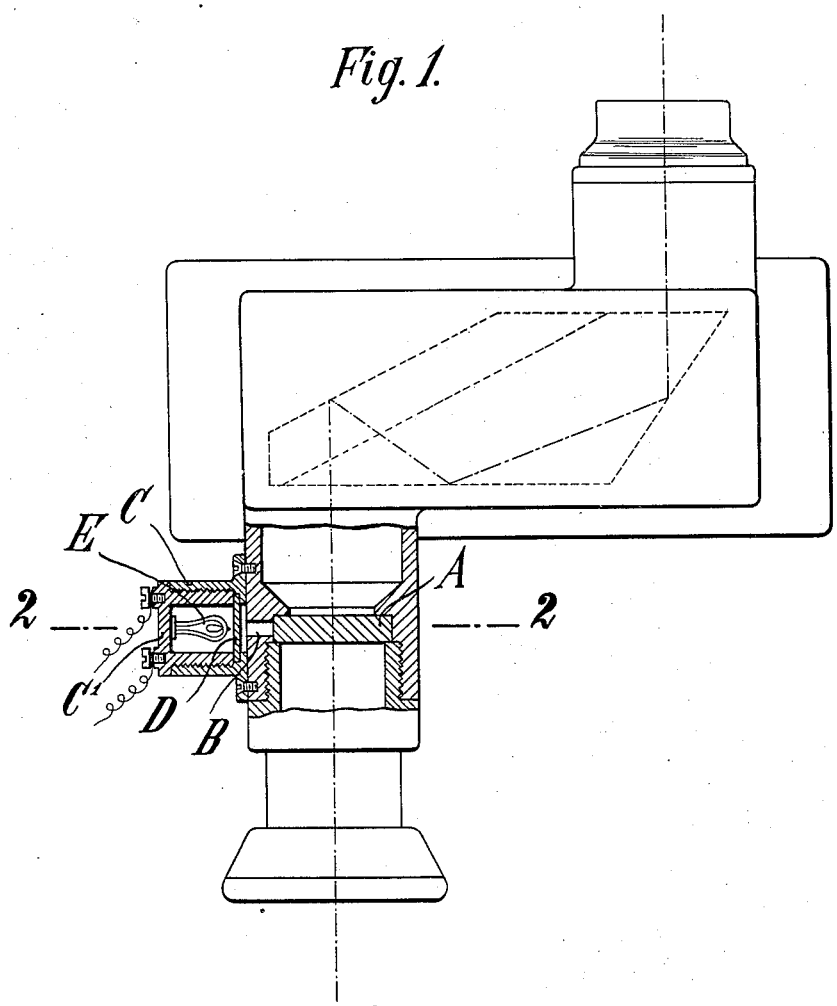
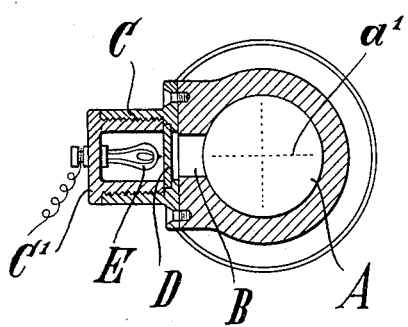

UNITED STATES PATENT OFFICE.

MARIO DA SILVEIRA NETTO, OF PARIS, FRANCE, ASSIGNOR TO FRIED. KRUPP AKTIENGESELLSCHAFT, OF ESSEN-ON-THE-RUHR, GERMANY.

SIGHTING-TELESCOPE.

No. 886,628.   Specification of Letters Patent.   Patented May 5, 1908.

Application filed January 8, 1907. Serial No. 351,333.

*To all whom it may concern:*

Be it known that I, MARIO DA SILVEIRA NETTO, a citizen of the Republic of Brazil, and a resident of Paris, France, have invented certain new and useful Improvements in Sighting-Telescopes, of which the following is a specification.

The present invention relates to those sighting telescopes which are provided with a device for illustrating the sighting mark (hair-cross or the like) in order to make it possible to use the telescope in darkness. The hitherto known sighting telescopes of this type have the drawback that the sighting field of the telescope, when the illuminating device is used, becomes so glary that the eye of the observer becomes blinded, and consequently observes very badly or not at all the image of the object to be aimed at.

The object of the invention is to avoid this drawback.

One embodiment of the invention is shown in the accompanying drawing, by the way of example.

Figure 1 shows a top view, partly in section, of the sighting telescope, and Fig. 2 is a section on line 2—2, Fig. 1.

The optical arrangement of the sighting telescope, which in the drawing is shown as a prism-telescope by the way of example, is old and therefore need not be described in detail.

In the proximity of the focal plane of the objective, a glass plate A carrying a sighting mark $a'$ (Fig. 2) is arranged in the usual manner. The sighting mark $a'$ consists of two intersecting rows of dots, the dots of each row being equidistant. The glass plate A is of circular form and has straight polished faces. That part of the telescope housing which surrounds the glass plate A is provided with an aperture B which is completely closed towards the interior by the curved face of the glass plate A. That part of the curved surface of the glass plate A that is exposed to the aperture B is transparent while the remaining part of the curved surface is made reflecting by means of a suitable coating. On the outer side the aperture B is covered, in a bell-like manner, by a sleeve or casing C secured to the housing of the telescope and closed towards the exterior by means of a cover C′ which is rigid with the sleeve. In the sleeve C, and directly in front of the aperture B, is arranged a transparent disk D which is colored red. On the inner side of the cover C′ is secured an electric lamp E.

The white rays of light that are emitted from the electric lamp E hit the transparent red disk D which allows the red rays of light to pass through while it absorbs all the other differently colored rays of which the white light is composed. The red rays which pass out from the transparent disk D reach the glass plate A through the aperture B and enter the glass plate through the transparent part of the curved surface of the plate. The majority of the entering rays of light strike the straight faces of the glass plate A, partly directly and partly after being reflected on the reflecting part of the curved surface of the plate A. The rays become totally reflected on the straight faces of the glass plate and being reflected over and over again spread over the entire plate. As the rays of light continuously are subject to total reflection on the straight faces of the plate A the rays cannot emerge from the plate A, in the direction of the axis of the eye-piece and they therefore become invisible to the eye of the observer. Only at those places where are located the dots forming the sighting mark, does a dispersion of the light take place, as the surface is rough, at those places, and the rays of light spread in all directions and consequently in the direction of the axis of the eye-piece. The dots of the sighting mark, therefore, are clearly visible and appear in red color. The red rays of light that emerge from the dots of the sighting mark also illuminate of course the glass plate A, but the illumination of the plate is so weak that it cannot have any disturbing effect, as, on the one hand, the red light has only small lighting power and, on the other hand, the luminous surfaces have only very small area as they merely consist of a number of dots. When the telescope is used in darkness the objects to be aimed at are therefore almost as clearly visible when the sighting mark is illuminated as when it is not illuminated.

It is further to be noted that the sighting telescope can also be used as a distance meter. The image of the target which is formed in the telescope can be measured as with a measuring stick by means of the rows of dots forming the sighting mark and, when the size of the target is known, the distance can be obtained in the known manner from the size of the image.

It is evident that the red colored transparent disk D could be replaced by a transparent disk of another suitable color without any departure from the spirit of the invention. It is merely essential that the colored light entering the glass plate A has small lighting power. If a source of light is used which in itself radiates light of a suitable color the colored transparent disk can therefore be omitted. It is not absolutely necessary to have the sighting mark consisting of dots as even when full lines are used a disturbing illumination of the sighting field does not take place in spite of the increase of the luminous surfaces, as the rays of light employed possess only small lighting power.

Having thus described my invention, what I claim, and desire to secure by Letters Patent is:

1. The combination with a sighting telescope having a glass plate carrying a sighting mark, of a light arranged to illuminate the sighting mark, and a colored transparent material arranged between the light and the glass plate.

2. The combination of a sighting telescope, having a glass plate carrying a sighting mark consisting of a number of dots, and means for illuminating the sighting mark.

3. The combination of a sighting telescope, having a glass plate carrying a sighting mark, the telescope being formed with an aperture closed at its inner end by the edge of the glass plate, a reflecting material on those edges of the plate unexposed to the aperture, a casing inclosing the outer end of the aperture a light arranged within the casing, and a colored transparent material arranged between the light and the glass plate.

The foregoing specification signed at Paris, France, this 26th day of December, 1906.

MARIO DA SILVEIRA NETTO.

In presence of—
JOHN BAKER,
HANSON C. COXE.